(12) United States Patent
Foster

(10) Patent No.: US 10,334,823 B2
(45) Date of Patent: Jul. 2, 2019

(54) FUNCTIONAL COMMUNICATION LEXIGRAM DEVICE AND TRAINING METHOD FOR ANIMAL AND HUMAN

(71) Applicant: Margaret Jeannette Foster, Gaithersburg, MD (US)

(72) Inventor: Margaret Jeannette Foster, Gaithersburg, MD (US)

(*) Notice: Subject to any disclaimer, the term of this patent is extended or adjusted under 35 U.S.C. 154(b) by 0 days.

(21) Appl. No.: 15/421,289

(22) Filed: Jan. 31, 2017

(65) Prior Publication Data
US 2018/0132453 A1  May 17, 2018

Related U.S. Application Data

(60) Provisional application No. 62/289,301, filed on Jan. 31, 2016.

(51) Int. Cl.
*A01K 15/02* (2006.01)
(52) U.S. Cl.
CPC .................. *A01K 15/021* (2013.01)
(58) Field of Classification Search
CPC ........ A01K 15/021; A01K 15/02; G08B 3/00; G08B 3/02; G08B 3/10
See application file for complete search history.

(56) References Cited

U.S. PATENT DOCUMENTS

| 2009/0051548 A1* | 2/2009 | Dundon | A01K 1/035 340/573.3 |
| 2012/0312247 A1* | 12/2012 | Ebersole | A01K 15/02 119/712 |
| 2017/0079242 A1* | 3/2017 | Mosley | A01K 15/021 |

\* cited by examiner

*Primary Examiner* — Kristen C Hayes

(57) ABSTRACT

The present invention is a functional communication lexigram device and training method for operation thereof that animals autonomously operate to initiate communication to "voice" their choices to (a) the people around them using recorded spoken words or sounds (or other detectable cue) and/or to (b) wired, wireless or internet connected accessory devices receiving an output signal from the device. The invention includes the method for training the human and the animal how to operate the device using operant conditioning techniques. Using the training method, the animal is taught to press or touch button-like modalities that are identified by visual-tactile-auditory cues and by position in a fixed array and to associate pressing each of the particular button-like modalities with particular positive consequences. The device is used by animals to initiate a communicative interaction with humans; it provides humans with an easily understood cue to meet an animal's needs to improve caregiving, and it provides the animal with more autonomy, choices, and control over environmental features important to it.

9 Claims, 9 Drawing Sheets

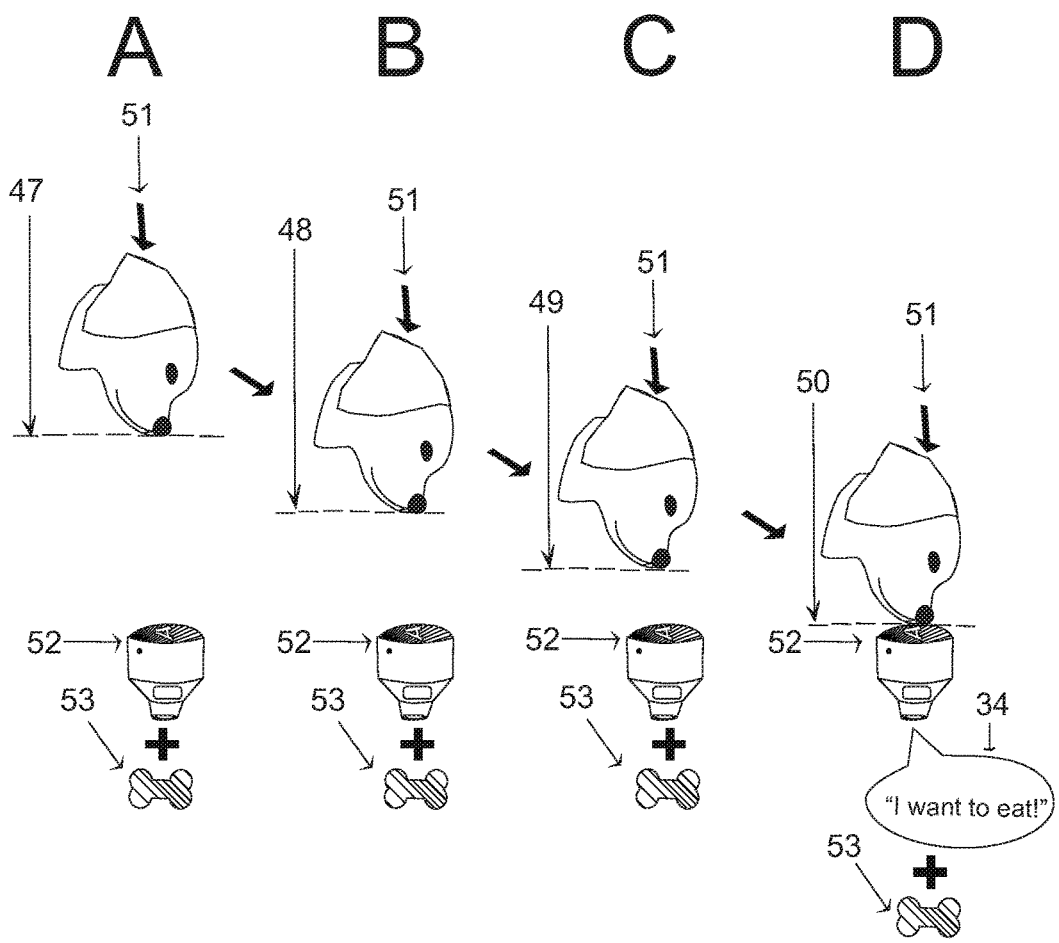

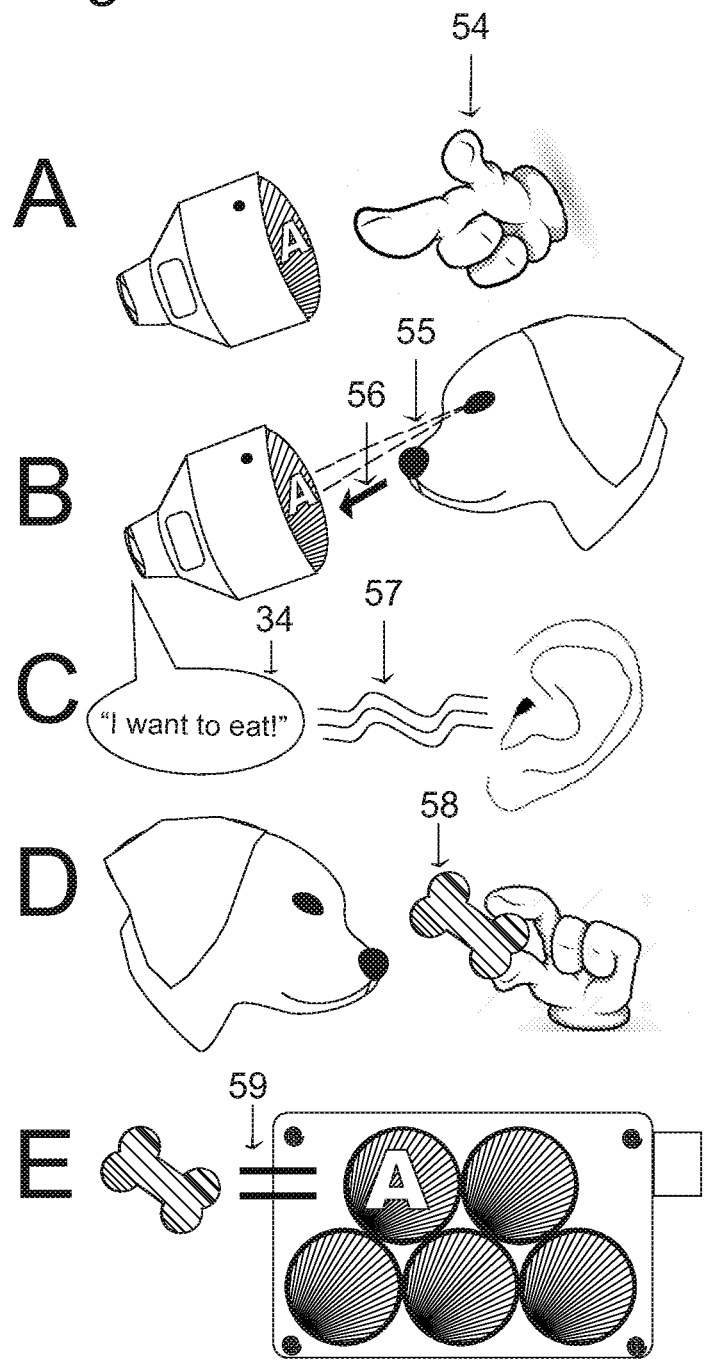

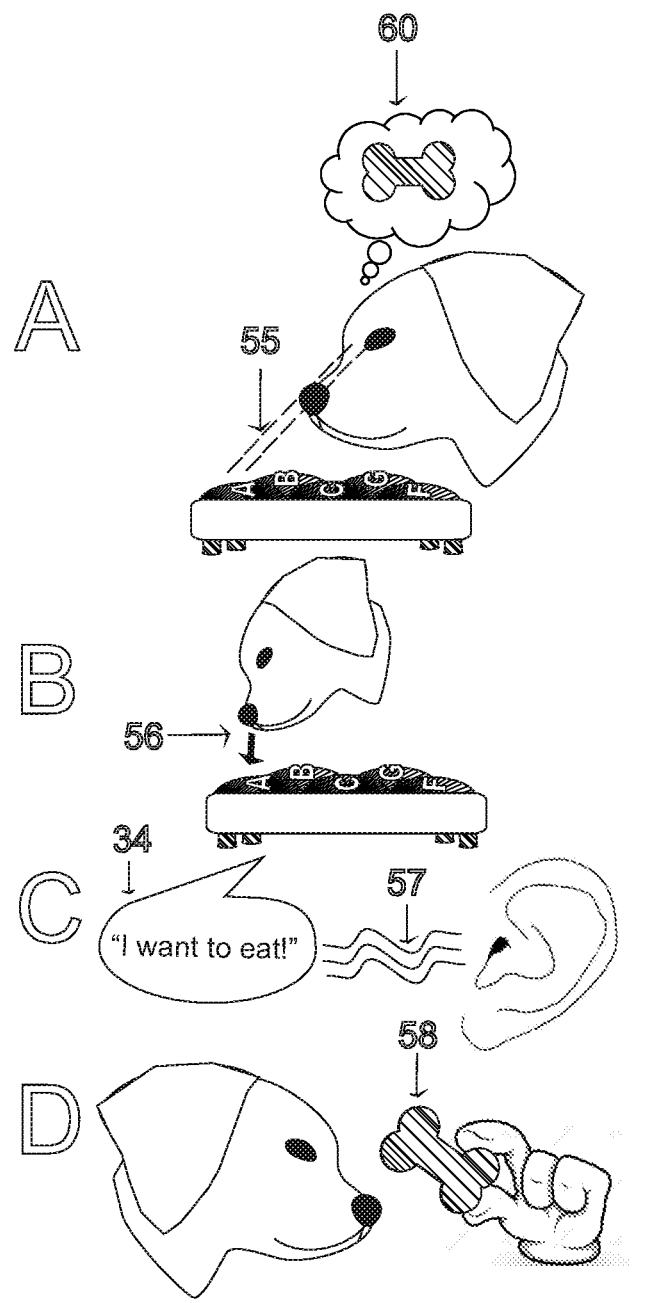

FUNCTIONAL COMMUNICATION LEXIGRAM DEVICE AND TRAINING METHOD FOR ANIMAL AND HUMAN

FIELD OF INVENTION

The present invention relates in general to the field of animal training, communication devices, and devices and methods for exercise and amusement of animals.

BRIEF DESCRIPTION OF THE INVENTION

Figure 1:
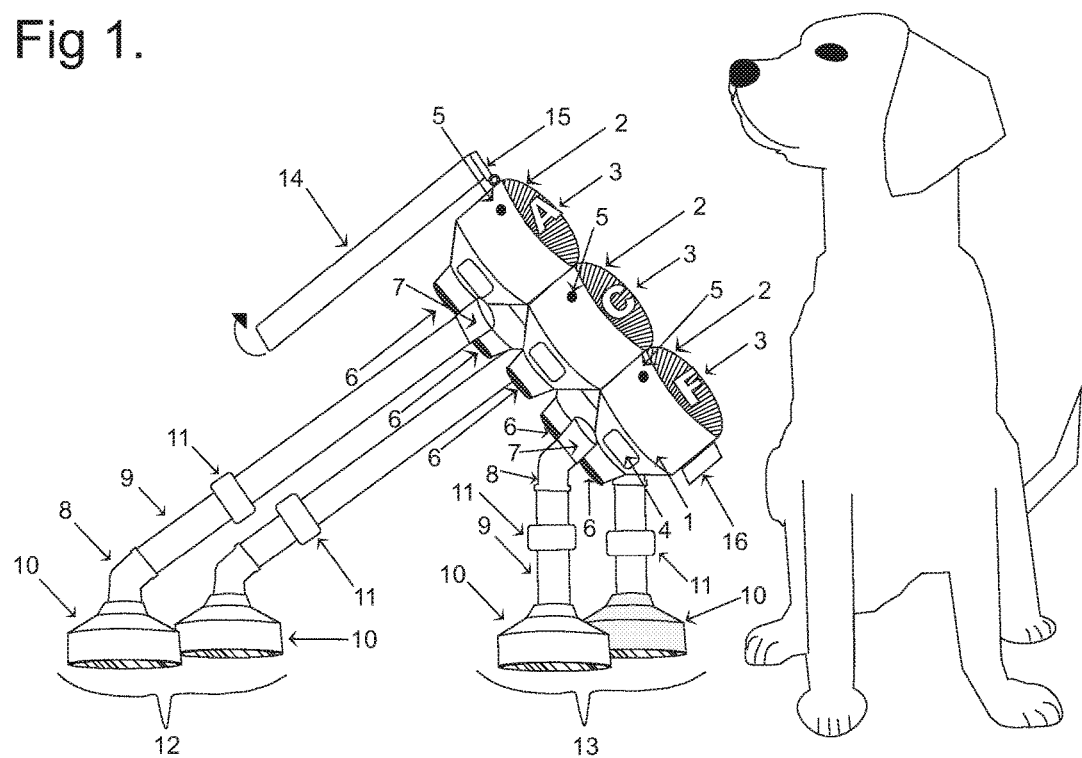

FIG. 1. Side view of the functional communication lexigram device's display panel on legs with adjustable height.

Figure 2:
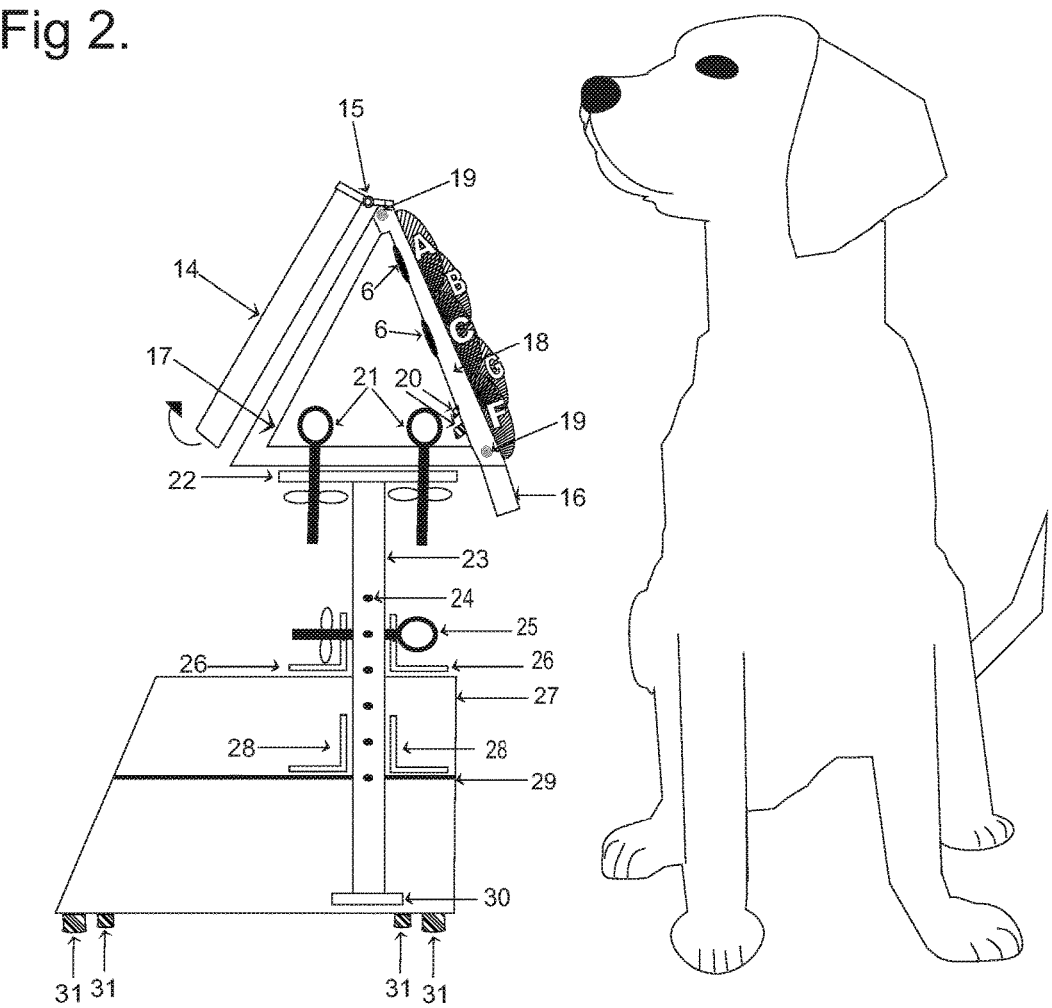

FIG. 2. Side view example #2 of the functional communication lexigram device's display panel on a base with adjustable height.

Figure 2A:
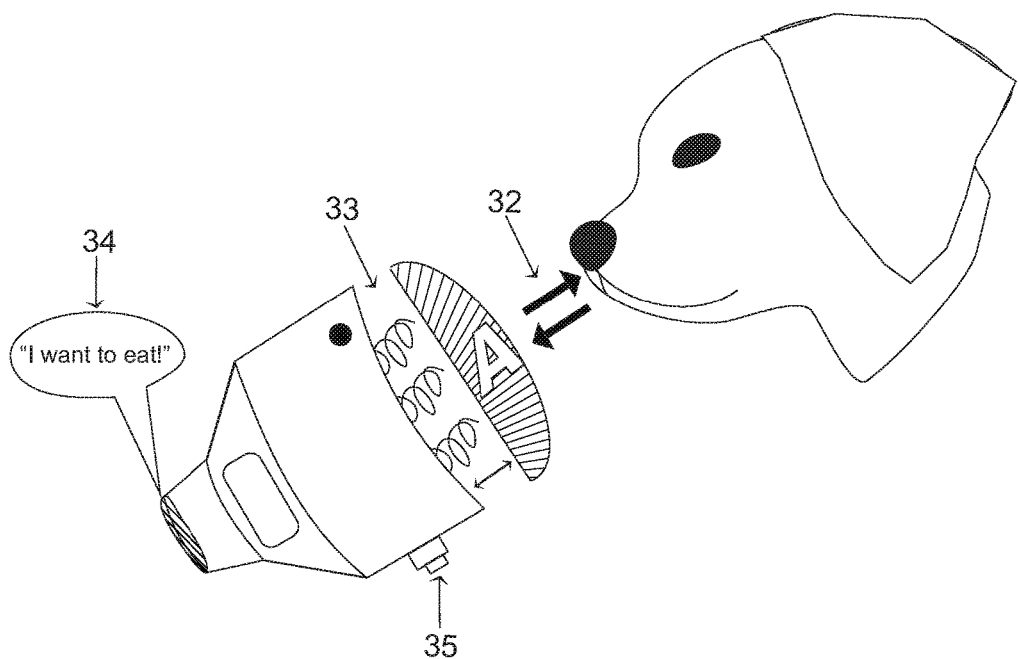

FIG. 2A. Exploded view of button-like modality being touched or pressed by an animal to activate a signal detectable by a human or WiFi enabled accessory device.

Figure 2B:
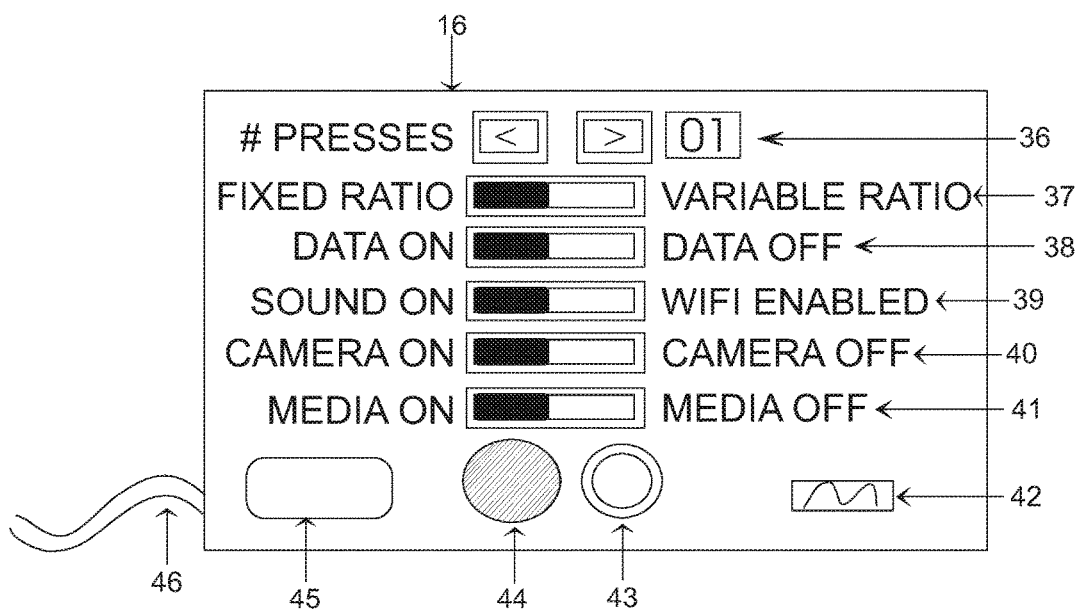

FIG. 2B. Exploded view of the control box that is used to apply or program different settings and/or modes for operating the device.

Figure 3:
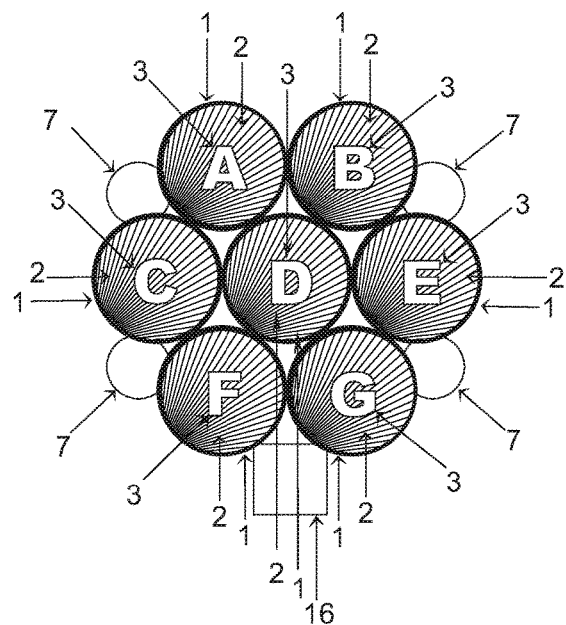

FIG. 3. Front view example #1 of the functional communication lexigram device's display panel.

Figure 4:
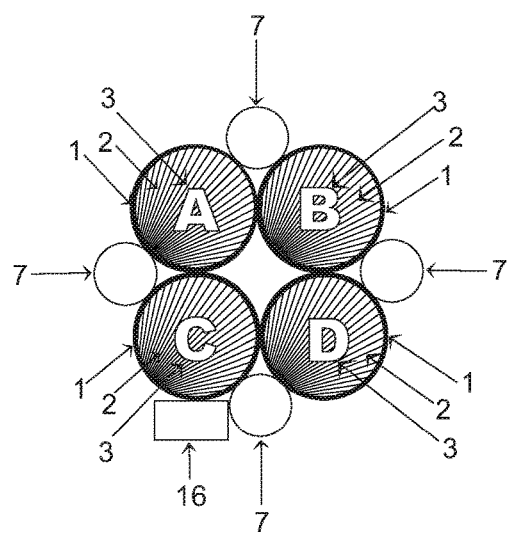

FIG. 4. Front view example #2 of the functional communication lexigram device's display panel.

Figure 5:
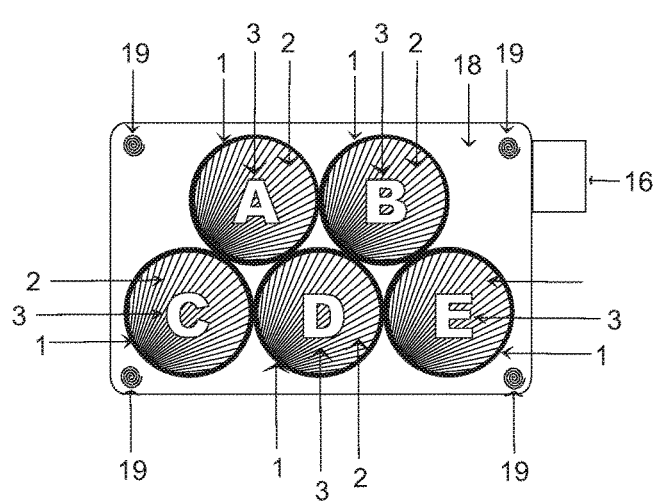

FIG. 5. Front view example #3 of the functional communication lexigram device's display panel.

Figure 6:
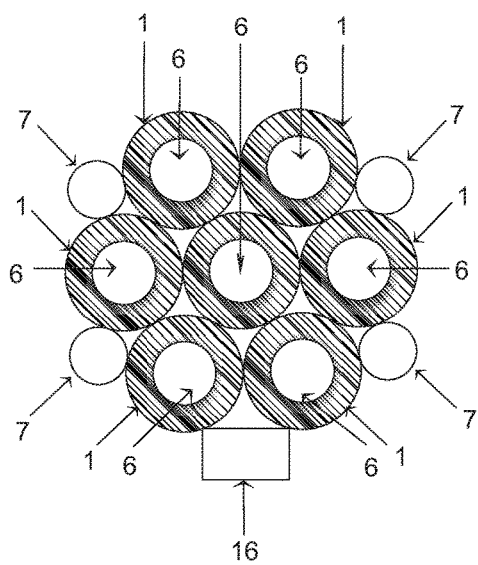

FIG. 6. Rear view example #1 of the functional communication lexigram device's display panel.

Figure 7:
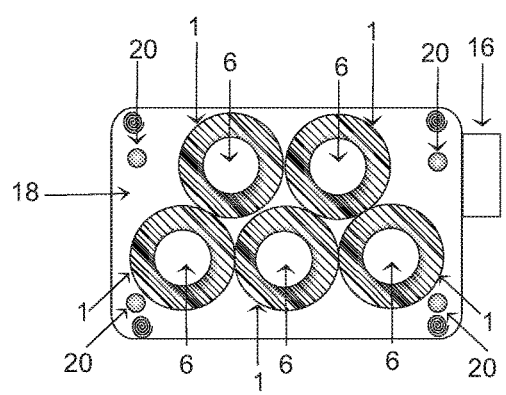

FIG. 7. Rear view example #2 of the functional communication lexigram device's display panel.

Figure 8:
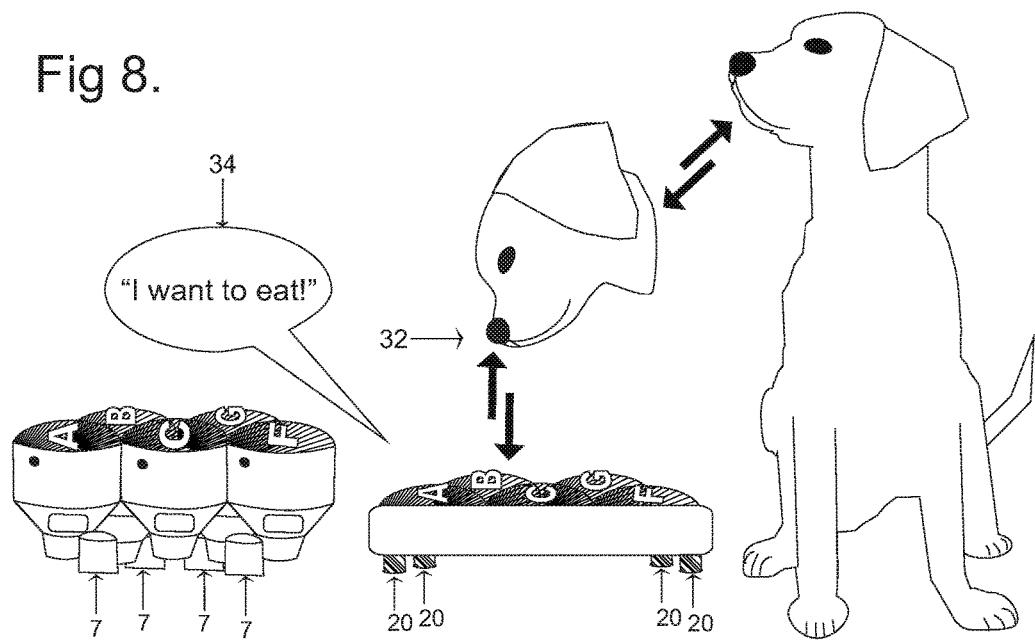

FIG. 8. Side view of the functional communication lexigram device with legs removed or front panel removed and sitting flat on the ground while being operated by an animal.

FIG. 9. Training method used to train the animal the preliminary response required to operate the device.

FIG. 10. Training methods used to train the animal to touch or press a button-like modality upon pointing a finger to operate the device and to associate a button-like modality's discriminative stimuli with a specified positive consequence.

FIG. 11. Animal choose at will to touch or press a button-like modality to express its identified and specified wants and needs.

Operation of the functional communication lexigram device (hereinafter referred to as the "device" or "invention") by the animal and the human enables precise animal-to-human communication by allowing a non-verbal animal (hereinafter referred to as "animal" or "animals" and defined as any animal that is domesticated or non-domesticated of any species, breed, age, or size although the preferred animal is a canine) to learn to initiate and autonomously express to humans its desire for a specified positive consequence (herein after referred to as "reinforcement") and/or to control a plurality of hard wired, wireless or internet enabled accessory devices receiving an output signal from the device (including, but not limited to, applications such as devices dispensing food or water; actuating doors, alarms, toys, household lights or appliances; sending messages via smartphone; video cameras with or without microphones; posting data, statements and visual images to social media and websites; instant messaging forums, etc., which are hereinafter referred to as the "WiFi accessory device" or "WiFi accessory devices").

The animal operates the device by touching or pressing a computer touch screen or button-like modality (hereinafter referred to as "button" or "buttons") that it autonomously chooses from a plurality of such modalities in a fixed array using its nose, paw, appendage, or other bodily motion (hereinafter referred to as the "preliminary response" although the preferred preliminary response for this invention is a nose press). The animal may also actuate the device using an object held in its mouth. The preferred preliminary response is specified as a nose press because the prototype research showed that persons using the training method to teach the animal to operate the device were able to train this preliminary response more easily than other bodily motions and nose pressing results in greater accuracy and control on the part of the animal.

Using the training method, the human teaches the animal discriminated associations between pressing or touching ("operating") the buttons and receiving specified reinforcement (hereinafter referred to as the "discriminative response" or "discriminated association"). The discriminated associations and discriminative responses are signaled to the animal by each button's identified visual-tactile-auditory cues and position in an array (hereinafter referred to as the "discriminative stimuli"). When the device is operated by the animal it may produce variously recorded spoken words, sounds and/or other detectable cues which identify a particular reinforcement; the human (and/or WiFi accessory devices receiving an output signal) responds by providing reinforcement to the animal on a fixed or variable ratio schedule of reinforcement. The discriminative stimuli not only serve a role for the animal in operating the device and associating its choices with reinforcement, the discriminative stimuli also improve the human's ability to train the animal to operate the device and to know when to appropriately provide the animal with its desired activity or item. Providing effective pet caregiving by meeting an animal's needs through the delivery of timely reinforcement serves as a positive consequence to the human. WiFi accessory devices may also be controlled by the autonomous choices made by the animal to operate the device, and also deliver the specified reinforcement as specified by the animal's choice of operation of the device. We have found through testing that an animal trained to use this invention using the training method disclosed may operate the device more frequently than desired by a human. The device therefore incorporates a cover or lid to clearly indicate to the trained animal that the device is not available to operate when the cover or lid is closed and/or installed on the device.

To operate the device the animal and human must first engage in the specified training method (based on principles from operant conditioning) wherein the human learns techniques to train the animal to perform the preliminary response, learn the discriminated associations, and engage in the discriminative responses required to operate the device and the animal learns from the human how to perform the preliminary response, make discriminated associations, and engage in the discriminative responses required to operate the device.

There are various ways the device can be operated once the training is completed such as: (a) The animal initiates and autonomously operates the device based on its own needs, wants, and desires (e.g., hunger, thirst, boredom, need for attention, etc.), (b) the human prompts the animal to operate the device based on the animal's typical behavioral cues indicating needs, wants, and desires (e.g., whining, jumping, barking, nudging, pacing, etc.), or (c) the human prompts the animal to operate the device base on his/her own needs, wants, desire to engage in a scheduled pet caregiving task (e.g., feeding an animal before leaving for work in the morning).

DETAILED DESCRIPTION OF THE INVENTION

Lexigram Device

The device can be placed anywhere the animal can access it. The device contains a plurality of button-like modalities in a fixed array (hereinafter referred to as the "display panel") and may be adjustable in height to accommodate any sized animal. The number of button-like modalities in a display panel can vary from one to an unlimited number because each button is detachable and re-attachable. The discriminative stimuli and reinforcement pairings designated for each button are programmable and re-recordable. The assignment of the various stimuli or positive consequences associated with operation of the device are determined by the human to be appropriate to the animal to be trained. The button-like modalities can be pressed or touched by the animal one at a time, in a sequence or string, and can be programmed to require one or more number of presses to produce cues detectable by the human (the preferred embodiment discussed herein being a sound or recorded spoken words) or to operate WiFi accessory devices. The reinforcement provided to the animal learning the discriminated associations and performing the preliminary and discriminative responses generally involves a selection of primary and/or conditioned positive consequences (e.g., food, access to outside, petting, attention, praise, affection, toys, play, etc.). The schedule upon which the human, or WiFi accessory devices, delivers the reinforcement can be fixed or varied and the number of touches or presses required by the animal to earn the reinforcement can be fixed or varied. The fixed array of button-like modalities may be used to collect data on an animal's performance including, but not limited to, count of presses or touches, duration of time pressing or touching, overall rate of responding, and rate of choosing one button versus another. The human training the animal may also be provided with a performance tracking system that has instructions of how to train and to collect direct observational data on the animal's performance. Combined these data serve as feedback to the human regarding their training effectiveness in teaching the animal to operate the device and can, if desired, be communicated or shared through online social media or websites in various formats including tables, graphs, and personality profiles. If the context is deemed by the human as not appropriate for the animal to have free access to the device to operate it, the operating display panel of the lexigram device (i.e. the fixed array of buttons) can be covered by a lid and/or turned off by an "on-off" toggle switch to prevent the animal's autonomous and spontaneous pressing or touching of the button-like modalities and therefore use of the device. The cover, lid, or "on-off toggle switch" provides functionality to the human by protecting certain daily acts of living from disruption by the animal's self-actuated use of the device (e.g., when humans are having dinner, guests are visiting, sleep times, etc.).

Each button is connected to a control and power circuit with wireless fidelity capabilities (e.g. Bluetooth or a similar short range wireless capability) and input/output options. The controls may include a power supply (battery and/or AC power supplies regulated to the power requirements of the circuit board or boards), solid state memory, and provisions for input and recording of sounds (including voices) or other cues detectable by humans (e.g., lights, vibration, printed text sent to a TV screen, computer or smart phone which are herein referred to as the "detectable cue") and output of analog or digital signals to a speaker or speakers, and to other wirelessly connected devices (including, but not limited to smart phones, software applications, appliances, or other devices which may be enabled to respond to the signal from the button-like modalities using an appropriate arrangement of software and hardware). The invention can thereby be connected to any number of WiFi accessory devices or computer/smart phone or online internet applications.

Training Method

The method disclosed is based on the well-established principles of behavioral science in general and operant conditioning in particular. The method of this invention when followed as described allows any person to train an animal to use the lexigram device with a minimum number of steps and with no training or expertise themselves in behavioral science generally or operant conditioning in particular.

First the person identifies the button position and visual-tactile-auditory stimuli which they wish to train the animal to select. Typical initial selections would be such items as "feed me", "I want to play", "I need to go out", "give me my toy," etc. These messages may be recorded in the memory associated with each button of the lexigram or may be programmed to send a message to an accessory device in order to be (for example) displayed on a screen or to actuate an accessory device programmed to respond to the actuation of each button (again, although "button" is used in this description, it is understood that the button-like modality can be any device which generates a signal or cue when touched or pressed by an animal). The animal is first encouraged to approach the device or a single detached button from the set of buttons by the human via providing positive reinforcement such as food. FIG. 9 shows the delivery of reinforcement contingent on the animal's proximity to the device. While observing the animal the human next provides reinforcement only when the animal's appendage (preferably nose although paw or other appendage can be used or the animal can hold an object in its mouth to touch the lexigram) is moved closer in proximity to a button than during a previous attempt and this is repeated until the animal touches or presses the button (see FIG. 9, panels A-D). The human next provides the animal with positive reinforcement only when it touches or presses the button with sufficient force to cause the device to operate and produce an output signal or cue detectable by the human or an electronic signal detectable by WiFi accessory devices (see FIG. 9, panel D). This step is repeated until reliable touching or pressing by the animal is obtained at a sufficient rate. As shown in FIG. 10, panel A, the human next trains the animal to engage in touching or pressing each button when prompted to do so (such as by pointing a finger at the intended button but any effective and consistent prompt will work). As long as the animal touches or presses the designated button within a short time of receiving the point prompting (approximately 5 seconds or less) (see FIG. 10, panel B), then upon hearing the sound or recorded speech message (see FIG. 10, panel C) the human then provides the specified reinforcement (see FIG. 10 panel D). At this point the animal is provided free access to the device so the animal can operate the device at will. The animal is trained to associate touching or pressing each particular button with its position and visual-tactile-auditory stimuli and a specified reinforcing consequence (see FIG. 10, panel E) by repeatedly pairing the sequence of the human pointing or otherwise prompting attention to a button, the animal touching or pressing it, and the human providing the specified reinforcement. In the pairing example in FIG. 10 the button identified by position and "A"=Food but any positive consequence can be substituted (e.g., pairing button identified by position and A=Toy). The human repeats these pairings to train a discriminated association for every identified positioned button in the fixed array and for any new button(s) added to the fixed array.

The human then continues to strengthen the various discriminated associations learned by the animal between touching or pressing an identified button and receiving specified reinforcement by the human pointing or prompting the animal to touch or press an identified button prior to delivering routine pet caregiving items or activities assigned to particular buttons whether those routine acts be scheduled events (e.g., play, petting, praising, feeding or walking in the morning or evening) or events the animal is prompting the human to deliver using its own behavior-based cues. The human then repeats this association pairing process until the animal firmly grasps the associations as demonstrated by the animal spontaneously and autonomously touching or pressing buttons without prompting from the human (see FIG. 11, panels A-D).

At each stage of training a fixed ratio schedule can be implemented for the number of presses required to earn reinforcement (i.e., reinforcement is given after some fixed number of times the animal presses a button) and/or a variable ratio schedule can be implemented (also known as a "gambling" schedule wherein responses are provided only a fraction of the time the button is touched or pressed) to increase the rate of responding, to strengthen the associations learned, and to make the performance less susceptible to extinction.

Preferred Embodiment of the Lexigram Device

Preferred Embodiment

FIG. 1 of Attachment A shows the preferred embodiment of a plurality of design options for the functional communication lexigram device which could be fashioned from any sufficiently rigid material (various prototypes have been constructed of wood, PVC pipe fittings, and rigid foam). FIG. 1 is a side view and outlines examples of the display panel button casing sitting at an upright angle (see 1), the button-like modalities that could be a computer touch screen or mechanically activated (see 2), the position of and visual-tactile discriminative stimuli affixed to each button (see 3), an area to insert batteries (see 4), a switch to record the auditory sound, message or other detectable cue (see 5), a speaker area where the auditory message or sound escapes (see 6), pegs to connect and disconnect legs (see 7), 90-degree joints that connect to the pegs or footers so that the legs are vertical (see 8), pipe-like leg extensions (see 9), wide footers to ensure the device is stable (see 10), and sliding cuffs to give the legs adjustable height (see 11). The example design shown in FIG. 1 is for demonstration purposes only and shows the device sitting upright on four legs—two back legs (see 12) and two front legs (see 13)—with the silhouette of a canine sitting in front of it preparing to operate the device by touching or pressing a button using its nose; however, in addition to canines, almost any animal is physically capable of operating this device if properly trained using the training method described herein. The device is equipped with a cover or lid (see 14) that swings open and closed via a hinge (see 15) to block the animal's usage of the device depending on the appropriateness of context, and it has a control box containing various toggle switches and modes (see 16) which are described in more detail below.

FIG. 2 of Attachment A shows another preferred embodiment of a plurality of design options for the functional communication lexigram device which could be fashioned from any sufficiently rigid material (various prototypes have been constructed of wood, PVC pipe fittings, and rigid foam). In FIG. 2 the design of the display panel for the button-like modalities is similar to FIG. 1; however it has a hollow-centered triangle-shaped casing used to display the button-like modalities at an upright angle (see 17) (hereinafter called the "top display panel unit") and a square front panel (see 18) that is removable via screws (see 19) so it can be placed flat on the floor on pegs (see 20) to allow any sized animal to operate it (i.e., as when used by small animals). The triangle-shaped top display panel unit can be attached or removed from its base stem using eye-bolts and wing nuts slipped through lined up holes (see 21) in the bottom panel of the unit and a platform (see 22) attached to an adjustable stem (see 23) protruding from the base box (see 27). The stem is inserted in a hole in the top of the base box and the stem's height is increased or decreased by sliding it up or down to line up holes drilled through it about every 2 inches (see 24) with holes in two L-shaped metal brackets (see 26) attached to the top of the base box and then inserting an eye-bolt with wing nut to secure it (see 25). Inside the base box there is a middle "shelf" that also has a hole that the stem is inserted through (see 29) and two L-shaped metal brackets attached to its top side (see 28) to create added stability for the stem. The bottom of the stem has a stopper to prevent its removal from the base box (see 30). The base box is equipped with four footers to create stability (see 31). In the example design shown in FIG. 2, for demonstration purposes only, the device is shown with the silhouette of a canine sitting in front of the device with the top display box attached to the stem but because the top display box is detachable, it can also be operated while sitting on the floor at an upright angle to accommodate use by a smaller animal or, as previously stated, its front panel can be removed and placed flat on the floor to accommodate use by an even smaller animal. In the example the canine is preparing to touch or press a button using its nose to operate it; however, in addition to canines, almost any animal is physically capable of operating this device if properly trained using the training method described herein. Just like in FIG. 1, in FIG. 2 the device is equipped with a cover or lid (see 14) that swings open and closed via a hinge (see 15) to block the animal from usage of the device depending on the appropriateness of context, and a control box containing various toggle switches and modes (see 16) which are described in more detail below.

FIG. 2A of Attachment A shows the exploded view of one preferred embodiment of a plurality of design options for the button-like modality which could be fashioned from any sufficiently rigid material (various prototypes have been constructed of plastic and computer touch screen technology) in any shape (e.g., round, square, triangular, etc.). FIG. 2A shows for demonstration purposes only the silhouette of a canine autonomously touching or pressing the button (see 32) that could be a computer touch screen or mechanically activated using its nose such that the touching or pressing of a button some unlimited number of times is registered by or activates an internal mechanism (see 33) thereby activating a recorded message or sound (see 34) or other cue detectable by humans; collecting performance data; activating a camera, video recorder, and/or microphone; and/or sending a WiFi signal to operate any number of WiFi enabled accessory devices or computer/smart phone applications or online social media and websites which may be added in the future. FIG. 2A also demonstrates that each button is detachable and re-attachable from the other buttons in a fixed array (see 35). The display panel is modular so that an unlimited number of button-like modalities can be added to a fixed array.

FIG. 2B of Attachment A shows an exploded view of the control box (see 16) which outlines a preferred embodiment of a plurality of design options for the functional communication lexigram device's mode of operation including the number of touches or presses required to activate the button (see 36), the ratio schedule of touches or presses required to activate the button (see 37), the collection of performance data such as, but not limited to, count and duration of touching or pressing the button-like modalities, rates of usage, rates of preference for choosing one button compared to another (see 38), the mode of operation in terms of playing a signal that a human can comprehend or detect (e.g., sound, spoken words, flashing lights, vibration, text displayed on a TV screen, computer screen, or smart phone) or sending a signal to accessory WiFi devices or both (see 39), activating a camera lens (see 40 and 43) and microphone (see 40 and 44) to take live video or photographs, and sharing information with online social media and websites including uploading sound or speech messages, video, photographs, and performance data (see 41). The control box also features a USB portal (see 42) and two power sources to enable portability—battery (see 43) and A/C electricity (see 44).

FIGS. 3, 4 and 5 of Attachment A show three examples of a plurality of front-view design options for the preferred embodiment of the functional communication lexigram device's display panel for the button-like modalities including, but not limited to, circles (see FIGS. 3 and 4) and squares (see FIG. 5). In these three examples, the fixed array of button-like modalities could be a computer touch screen or mechanically activated. Likewise, in these examples, seven, four and five button-like modalities are shown in a fixed array; however, the number of possible button-like modalities; fixed arrays; and number of touches or presses required to operate the button-like modalities are all unlimited. FIGS. 6 and 7 of Attachment A show two examples of a plurality of rear-view design options for the preferred embodiment of the functional communication lexigram device's display panel for the button-like modalities including, but not limited to, circles and squares. FIG. 8 of Attachment A shows two examples of a plurality of design options for the preferred embodiment of the functional communication lexigram device's display panel for the button-like modalities including, but not limited to, circles and squares. In these two examples, the array of button-like modalities could be a computer touch screen or mechanically activated. Also, FIG. 8 demonstrates a canine's use of the device's display panel (see 32 and 34) sitting flat on the ground on small pegs (see 7 and 20) as an example of its versatility, portability, and ease of operation by any animal, large or small including, but not limited to, any domesticated or non-domesticated non-verbal animal.

FIGS. 9, 10 and 11 show the preferred embodiment for the training method which outlines the minimum required steps for training an animal how to operate and/or activate the device using the training method described herein either through human or environmental prompting or of the animal's own free will or both with reinforcement being delivered by the human or a WiFi accessory device.

FIG. 9 panels A-D show the "shaping process" involved in training the animal to perform the preliminary response of touching or pressing the button by providing reinforcement for closer proximity and successive approximations to the required response. For example, in panels A-D the dashed line (see 47, 48, 49 and 50) represents the change in proximity between the animal's nose and the button that is required for receiving reinforcement (see 53) contingent on the lowering of the animal's head and nose (see 51) closer to a button (see 52) starting, for example, at a proximity of 6 inches above a button (see 47, panel A) but then changing the reinforcement requirement to 3 inches (see 48, panel B), 1 inch (see 49, panel C), and finally to touching or pressing the button (see 50, panel D) and with enough force to activate it (see 34).

FIG. 10 panels A-E show two processes for training the animal to first attend to an identified positioned button and then touch or press the identified button after the human prompts with a finger point (or uses some other detectable cue) and for training the animal to associate touching or pressing an identified positioned button with enough force to activate the button and receiving specified reinforcement. More specifically, in this example, the human's finger point prompts (see 54, panel A) the animal to attend to an identified positioned button (see 55, panel B), the animal touches or presses the identified positioned button with its nose (see 56, panel B) with enough force to activate the device (see 34, panel C) which is detected by the human (see 57, panel C) or WiFi accessory device, reinforcement is delivered to the animal (see 58, panel D) by the human or an WiFi accessory device, and after some number of repeated pairings, the animal learns to associate touching or pressing the identified positioned button with receiving specified reinforcement (see 59, panel E). These training steps are completed for every identified positioned button appearing in the fixed array, added to the fixed array, or when the identity of a button in the fixed array is changed, re-programmed, or re-recorded.

FIG. 11 panels A-D outline the typical usage of the device after the animal is trained through repeated pairings to associate pressing or touching an identified positioned button with a specified reinforcement. More specifically, the animal perceives its own internal need or want (e.g., hunger pang, thirst, boredom, emotion) (see 60, panel A), the animal attends to the identified positioned button it associates with the specified reinforcement that will satisfy its need or want (see 55, panel A), the animal touches or presses the identified positioned button (see 56, panel B) with enough force to activate the sound or recorded speech message (see 34, panel C) (or to send the WiFi output signal) which is detected by the human (see 57, panel C) or WiFi accessory device, and the specified reinforcement is delivered by the human (see 58, panel D) or the WiFi accessory device. The learning of the discriminated associations and discriminated responses is evidenced by the animal's spontaneous and autonomous operation of the device. Post training the device can be operated by the animal's free will or by the human's finger point prompting (or some other detectable cue) or both.

BACKGROUND OF THE INVENTION

In hopes of better enriching an animal's environment to maximize its health and mental well-being, for as long as humans have domesticated and housed animals they have surmised ways to better interpret an animal's behavioral attributes (such as crying, whining, barking, jumping, nudging, etc.) when it is attempting to communicate needs and desires. Research on captive and confined animals has repeatedly shown that increasing an animal's autonomy, opportunity to make choices, and means of effectively communicating its needs creates an enriched environment which promotes emotional and mental well-being and reduces a variety of undesirable behavior. However, many of the techniques used with captive and confined animals have not made the transition to the general consumer with animals living in a home environment even though they too experience similar environmental deficits and demonstrate a wide variety of undesirable behavior such as fears, anxiety, hyperactivity, attention deficits, excessive barking/digging/jumping, attention seeking, destructive behavior, aggression, depression, etc. Because of this, the margin for error in attempts at communication and interpretation between humans and animals cohabitating together is not only stressful and frustrating for the human, it is stressful and frustrating for the animal. No one likes to wait, be misunderstood, or feel restrained, controlled, ignored or alienated—not even animals. And, yet most animals lack a means for initiating clear communication, obtaining emotional and mental stimulation, acting autonomously, and engaging in self-actuated choices in their daily course of life. And, this problem is compounded by the fact that, unfortunately, by design traditional animal obedience training is intended to stifle both autonomy and choice and positions the animal to be the recipient of communication but not the initiator of communication—animals are taught what to do, animals are told when to do it, and animals are expected to obey without exception or choice. This invention provides a means for animals, particularly canines, to demonstrate their untapped aptitude for communication created across tens of thousands of years of selective breeding for it.

The outcome from using the current invention is fourfold. First, this device corrects for these dilemmas by allowing humans and animals to communicate with a newfound level of clarity and cooperation by providing an animal with choice and autonomy by presenting it with a means to initiate communication using its untapped aptitudes and intelligence (not just be the recipient of communicated commands); a "voice" to specifically request its most desired reinforcement using recorded spoken words or sounds and/or using WiFi connectivity to accessory devices; and to do these things without receiving commands from a human. After learning to operate the device, first the animal "thinks it," then the animal "says it" by selecting and touching or pressing a button. Second, this device provides an animal with improved mental stimulation and control over environmental factors important to it, such as the delivery of food, water, light, sound, toys, access to outside, etc., depending on what WiFi accessories are made available. Third, the device provides humans with a clear medium for better understanding the depth and breadth of an animal's needs, psyche, and personality which in turn not only elevates the human's opinion of the animal's status as an intellectual feeling being, but it changes the way the animal is cared for and treated for the better. Fourth, because the device is WiFi enabled, the animal's preferences and improved status as an intellectual and feeling being can be profiled and shared via online social media and websites and be known to its owner even when they are not together. This expands both the human's and the animal's social networking abilities.

The underpinning that makes the device operable for both animal and human is based on over a century of scientific research on behavioral principles in operant learning, including reinforcement, conditioned reinforcement, shaping procedures, discrimination training, problem solving incidental training issues, skill-based animal training techniques, and a teaching technique called "functional communication training" which is a broadly used and clinically validated technique that helps teach vocally/verbally challenged animals—including autistic children, great apes, and even dolphins—to "speak" in more understandable conventional ways (e.g., pointing, picture exchanging, signing, pressing buttons on a lexigram, etc.) without acting out in behaviorally disruptive ways. For the current invention, operation of the device using the training method herein results in a real behavioral phenomenon for the animal and the human.

Operation of the device creates an opportunity for animal-to-human communication that avoids misunderstanding or confounds between what an animal desires most at any given point in time and the human's ability to understand or interpret that desire and to provide specified reinforcement accordingly. Operation of the device also creates an opportunity for the animal to initiate communication (in contrast to being just the recipient of communication), to make autonomous choices and act independently (in contrast to only being commanded what to do), and to control features of the environment important to the animal when it activates the device (as opposed to being powerless). Operation of the device unlocks an animal's communicative aptitude not previously tapped by traditional means of training and/or interacting with animals. More specifically, because the operation of the current invention depends on an animal's self-actuated behavior-based autonomy and choices, it is enriching and empowering to the animal. Because the operation of the devices results in clearly understood spoken messages and the button-like modalities are identified with affixed visual-tactile lettered words, it improves the human's understanding and interpretation of the animal's needs and desires which in turn may create improved peace of mind, pet caregiving, and feelings of joy and wonder. The end result of using the device is a reduction in stress for both the animal and the human. This reduction in stress provides a foundation for the formulation of an intense interactive and communicative "team effort" bond between a human and animal that is dependent on learning and goes far beyond the "command-obey" relationship created through traditional obedience training. Also, with the WiFi accessory mode enabled, an animal's self-actuated autonomous access to reinforcement when a human is present or absent can help decrease many undesired problem behavior, such as separation anxiety. These things can be of particular importance when introducing an animal into a new context.

Our prototype research using three case study subject canines (hereinafter referred to as "S1," "S2, and "S3") showed that after completing the training method, each dog used the device frequently for its intended purposes and each dog learned to value it. Our research also showed that extended use of the device results in ongoing "emergent" learning on the dogs' behalf with regard to other functional relationships that exist between the choice-reinforcement button options. For example, S1 learned that pressing to say "I love you" before pressing to ask for food amplified the magnitude of the reinforcement delivered—this could be loosely characterized as an emotional manipulation. And, S1 learned that pressing to say "I want to go out. I have to potty" not only resulted in being let outside, but it commanded a higher level of urgency and therefore faster action on the part of the human. S1 also learned that "toy" and "play" are functionally related and so S1 often pressed them in combination. S1's discriminative response was a nose press, but sometimes S1 pressed the buttons using a ball or other toy held firmly in her mouth like a tool. In addition, S1 often specified which human she'd like to delivery said requested reinforcement by making eye contact with that particular person, running to that particular person, or waiting for that particular person to enter the room before making a request. S1 also often "called out" requests to persons who were not in the room but within hearing distance. S1 frequently made the same request at different times to different persons in an attempt to maximize favored reinforcement, such as requesting a second round of feeding in the morning—this too could loosely be conceptualized as fibbing. S1's overall rate of usage of the device increased noticeably when she perceived a low probability of receiving attention or reinforcement in general, such as when S1 could plainly see a person was engrossed in tasks such as using a smart phone, computer laptop, or watching TV. Finally, when receiving a finger point prompt by person, S1 would sometime refused to press the indicated button depending on her desire—this is akin to saying "yes" or "no" to reinforcement options offered. Likewise, S2 resided in a two-dog family and refused to allow the household's second dog to get near the device. S3 became distraught when the device was blocked for usage. These developing novel and creative uses of the device by three case study dogs serve as proof of the device's and the training method's operational effectiveness.

DESCRIPTION OF RELATED ART

Prior art related to lexigram devices include patents for devices fashioned for the use by marine mammals only (e.g., U.S. Pat. Nos. 5,392,735 and 7,392,192), as well as patents that demonstrate only limited functionality relative to the present invention, such as pet-actuated door bells to alert pet owners to a pet's need to enter or exit the house (e.g., U.S. Pat. Nos. 6,240,880, 4,400,696, 5,475,369, 6,433,692, 6,094,139, 4,323,883, US20110221605, U.S. Pat. Nos. 5,705,990, 4,551,713, 5,952,926, 5,303,677, US20130220235, U.S. Pat. Nos. 4,686,504, 5,604,478, 6,445,302, 6,606,030, and US20050040954); pet-actuated toys that provide automated reinforcement without human involvement (e.g., U.S. Pat. Nos. 3,041,911, 5,535,703, 5,794,568, US20120097113, US20130081577, U.S. Pat. No. 8,869,748, and US20060011144); pet-actuated water and/or food dispensers (U.S. Pat. Nos. 4,924,812, 4,469,049, 7,677,200, 7,789,041, 6,526,916, 4,729,414, and 6,279,508); communication devices that allow a pet to interact with its owner remotely (US20130319337A1, U.S. Pat. Nos. 7,654,230, 7,878,152, 8,201,522, US20050284412, U.S. Pat. No. 6,910,447, US20060208910, US20140290582); and non-trained non-behavioral "translators" that claim to interpret an animal's sounds or other physiological events and "convert" them into communications understandable by humans (e.g., U.S. Pat. Nos. 5,749,324, 6,178,923, US20030221630, WO2005081227A1, U.S. Pat. Nos. 6,535, 131, 6,761,131, 5,790,033, 7,460,998, 6,761,131, 6,178,923, and WO2015009487A1). Most if not all of these inventions could not function consistently because they do not include a functional method for training the animal to use the device and/or do not clearly specify what behavior(s) is required to operate the device. None of them have the complete combination of features and training method of the present invention.

The most similar examples we have found in prior art are disclosed in U.S. Pat. Nos. 4,414,921, 7,057,515, 6,722, 318B2, and US20140000530 but, compared to the functional communication lexigram device herein, these devices have numerous limitations in scope and functionality and/or disadvantages in design including relying on non-trained non-behavioral phenomenon and/or other ineffective stimulus-response-consequence operations. The functional communication lexigram device described herein primarily differs from these patents as follows: (a) it is easily operated via nose presses thereby allowing use by most any animal, pet, or human and its operation relies on specified education, training, and learning of an actual discriminative behavioral phenomenon, (b) it is portable, (c) its design allows for the modality panel to be presented upright on a stand that has adjustable height and/or removable legs, (d) it has a fixed array of button-like modalities that can be recorded to represent unlimited request options and/or touched or pressed sequentially to make multiple unique requests at one time, (e) the visual-tactile-auditory-position discriminative stimuli are mutually exclusive and easily perceived by most animals, (f) the button-like modalities can be connected and disconnected so that the number presented and/or the configuration used can be easily modified, (g) because each button is connected to a control and power circuit with wireless capabilities (e.g. Bluetooth or a similar short range wireless capability) and hard wired input/output options, the device's control panel can therefore be connected to control any number of WiFi accessories or to talk with online social media and websites; and (h) the current invention includes a lid or "on-off" toggle switch to block the animal from operating the device depending on the appropriateness of context.

More specifically, U.S. Pat. Nos. 4,414,921 and 7,057,515 are both limited in functionality and scope in that they claim a primary purpose of (a) allowing an animal to signal the need for entrance or exit from a home (versus unlimited request options offered by the functional communication lexigram device, see d and f above), (b) require fixed mounting to the house so they are not portable (versus portability of the functional communication lexigram device, see b above), (c) have an operation that relies on the modality of pawing or pulling a ring and/or have only one modality as the signaling stimulus thereby limiting the type of animal that can use the device and limiting an animal's request options (versus the flexibility and ease of operation of the functional communication lexigram device, see a, d, e and f above), and (d) has no means of blocking the animal from using the device (versus the lid and/or "on-off" toggle switch offered of the functional communication lexigram device, see h above).

U.S. Pat. No. 6,722,318B2 claims to display one modality as the alert stimulus (e.g., a drawing) that can be related to a pet's hunger and/or need to go outside (versus the unlimited request options of the functional communication lexigram device, see d above). However, its effective operation is questionable given that (a) it relies on a hodgepodge signal matrix (e.g., utilizing two or more out of five sense stimuli—audio, visual, taste, tactile, and smell) that may be confounded and therefore nonfunctional due to the signals' presentation being non-confinable and non-retractable, at least for taste and smell stimuli (versus the mutually exclusive visual-tactile-auditory-position stimuli used in the functional communication lexigram device, see e above), (b) it does not specify what behavioral response an animal needs to engage in to actively touch or press a module aside from approaching the device to set off a motion detector (versus the functional communication lexigram device which outlines a detailed means for educating and training both human and animal how to operate the device, see a above), and (c) has no means of blocking the animal from using the device (versus the lid and/or "on-off" toggle switch offered of the functional communication lexigram device (see h above). Combined, the complexity and difficulty that such a large matrix of discriminative stimuli would present in training or eliciting a pet's use of the device significantly impairs its effectiveness, usability, and functionality.

The device disclosed in U.S. Pat. No. US20140000530, unlike the functional communication lexigram device described herein, does not include or describe learning and training methodology of an actual behaviorally discriminative phenomenon involving choice on the part of both the animal and human. Rather, the functionality of U.S. Pat. No. US20140000530 is presumed on a pet's ability to demonstrate a spontaneous non-trained respondent "instinctive act" (i.e., pawing motion) to operate it (versus the functional communication lexigram device which outlines a detailed means for educating and training both human and animal how to operate the device, see a above). This is a common defect among many of the lexigrams described by the prior art: without a training methodology to produce operant and discriminative learning, the lexigram will be inert. Animals do not understand human language, read, or think in ways that can be universally translated and "instinct" will not lead an animal to spontaneously utilize any device for communication. And, like all of the other patents, this patent has no means of blocking the animal from using the device (versus the lid and/or "on-off" toggle switch offered of the functional communication lexigram device, see h above).

The most similar example we have found to this invention is described in two research studies investigating the linguistic relationship between a dog's visual recognition of icon symbols and associated consequences using a lexigram device and training method (Rossi & Ades 2008 and Savallie, De Resende & Ades 2013). The lexigram device discussed in these studies focused on training arbitrary geometric symbols as cues and was not adjustable to accommodate use in any context or by any variety of animal regardless of species, breed, age, or size or any variety of consumer regardless of their level of expertise. Specifically, the lexigram disclosed herein differs from the lexigram device used to conduct these research studies in terms of (a) the device allows for the button display panel to be presented at any appropriate angle and attach to a base stand that has adjustable height and/or removable legs, (b) it has a fixed array of button-like modalities that can be easily re-recorded to represent unlimited request options and visual-tactile discriminative cues that are exchangeable and may appear as printed words to aid the human's use in training, (c) the button-like modalities can be connected and disconnected from each other so that the number presented and/or the configuration used can be easily modified, (d) each button is connected to a control and power circuit with wireless capabilities (e.g. Bluetooth or a similar short range wireless capability) and hard wired input/output options so the device's control panel can be connected to control any number of WiFi accessories or talk to online social media and websites; and (e) the current invention includes a lid or means of blocking the animal from operating the device; this final feature is necessary in order to stop a trained animal from using the device excessively. We believe that the lack of any such provision in the prior art is evidence that the prior art devices were not successfully operated by animals.

The method used in these research studies focused on studying the visual relationship of icons and consequences for the animal and trained the dog to press with its paw exclusively. We have found that the paw press is not well controlled or suited to the use of the lexigram device by the general public. And the method disclosed herein enables any person to train an animal without any previous training in behavioral science. Using the device and method of the invention provides consistent results in approximately 1 month of training in contrast to the approximately 15 months reported for the Rossie & Ades training method. Finally, the training method in these research studies differed from the current invention's training method in terms of the minimum number of steps required to accomplish the outcome of operating the device. Specifically, the following steps were included in the research studies but are not required by the current invention's training method to operate the device: (a) portions of the training were conducted in a basic laboratory setting (Rossi & Ades 2008) or all of the training was conducted in a basic research laboratory setting (Savalli, et al 2013) using a dog groomed from a young age to operate the lexigram device; (b) basic obedience training was conducted without the lexigram device being present (Rossi & Ades 2008); (b) a clicker device and training was used (Rossi & Ades 2008); (c) a verbal command "touch" and touch training was conducted with objects other than the lexigram device (Rossi & Ades 2008); (d) a "routine" training took place without the lexigram device being present wherein the dog was commanded with a question ("Do you want x?") and if the dog moved toward item x, then item x was provided (Rossi & Ades 2008); and (e) discrimination training was conducted using "preliminary signs" first without the lexigram device being present and then in a later step with the lexigram device being present (Rossi & Ades 2008).

In summary, the present invention combines some of the features of previous lexigrams but with an experimentally proven method for training the human and the animal to associate acts with specified outcomes in process of operating and activating the device. Furthermore, the present invention differs from traditional research lexigrams in that it does not rely on or attempt to establish nor test for linguistic relationships learned by the animal nor does it involve the complex apparatus or training method needed to investigate or test for linguistic relationships. With the current invention in its preferred embodiment, the animal is trained to associate a single outcome with a single choice by touching or pressing an identified discriminated button with its nose. The device then emits an audible word or phrase (or other cue a human can detect) that a human can clearly understand and respond to appropriately to improve pet caregiving. The device's operation relies on trained behavioral phenomenon—it does not rely on the animal understanding any abstract or linguistic concepts or voluntarily engaging in some instinctual fixed action pattern. Therefore, the present invention improves on all of the prior art devices and includes a method based on behavioral science and operant learning which can be practiced by anyone without formal training in behavioral science.

I claim:

1. A method of training a non-verbal animal to initiate communication and express choices to humans through operant conditioning processes including reinforcement, shaping a preliminary response, teaching discriminated associations, and training discriminative responses, said method comprising:

providing a lexigram device comprising an assembly having a plurality of buttons in a fixed array, wherein each button is independently programmable to initiate a signal detectable by humans;

wherein said assembly comprises a casing comprising said buttons and a removable cover, wherein the cover can be placed over the plurality of buttons to protect the device when the device is not in use;

allowing the animal to approach the device;

engaging the animal and repeatedly prompting the animal to apply pressure to one of the plurality of buttons and providing a positive reinforcement corresponding to the particular button the animal has applied pressure to;

repeating the step of engaging the animal until the animal applies pressure to the button without prompting, so that the animal becomes conditioned to applying pressure to certain buttons to receive a corresponding positive reinforcement associated with that button;

providing the animal with access to the device so that the animal is able to operate the device autonomously or when prompted by the human.

2. The method of claim 1, wherein the signal detectable by humans is at least one of: a sound, a visual indicator, an electronic signal, vibration, or a recorded statement.

3. The method of claim 2, wherein said electronic signal is at least one of WiFi, Bluetooth, or RFID.

4. The method of claim 2, wherein the visual indicator comprises light or text.

5. The method of claim 1, wherein said buttons are buttons of a touch-screen device.

6. The method of claim 1, wherein said assembly further comprises a power supply.

7. The method of claim 6, wherein the power supply comprises battery or AC.

8. The method of claim 1, wherein the assembly further comprises removable legs.

9. The method of claim 8, wherein said legs are adjustable in height.

* * * * *